June 19, 1951 W. H. STARKS 2,557,153
RADIO OBJECT LOCATING SYSTEM
Filed June 19, 1945 2 Sheets—Sheet 1
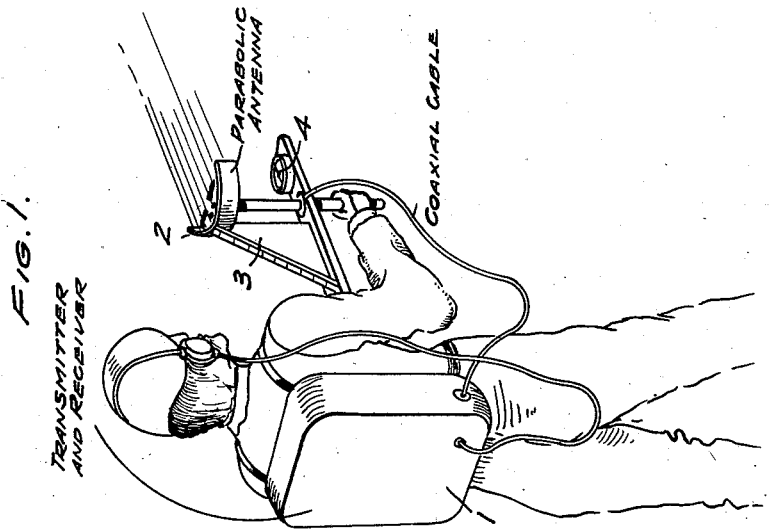
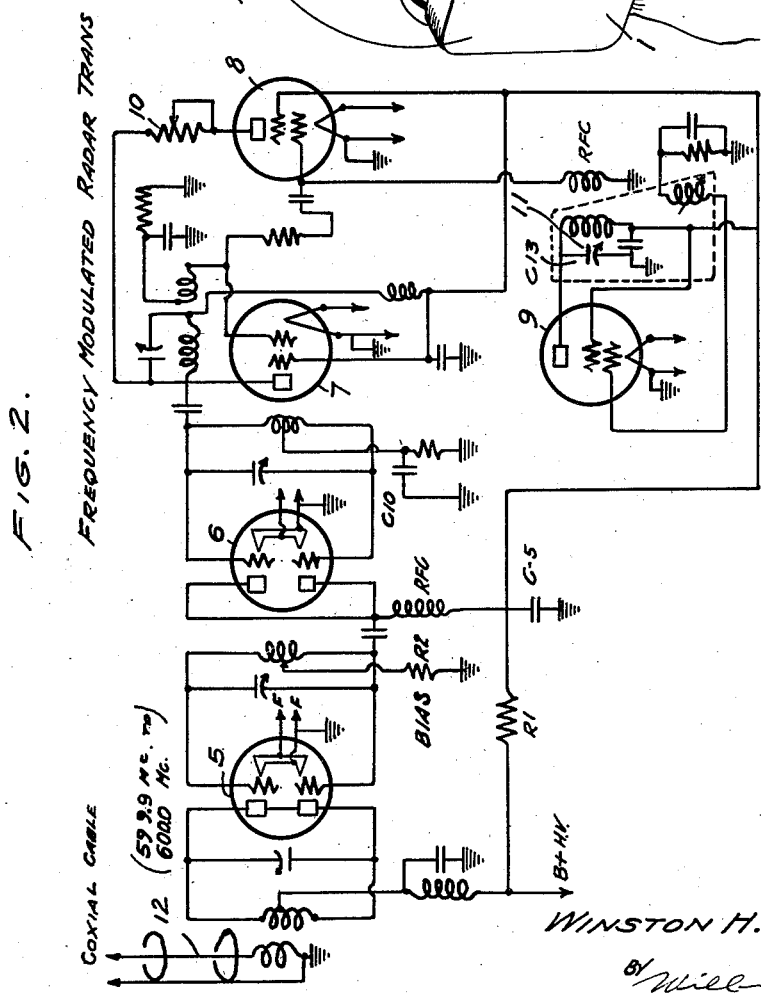
INVENTOR
WINSTON H. STARKS
BY William D. Hall
ATTORNEY June 19, 1951 W. H. STARKS 2,557,153
RADIO OBJECT LOCATING SYSTEM
Filed June 19, 1945 2 Sheets-Sheet 2

INVENTOR
WINSTON H. STARKS
BY William C. Hall
ATTORNEY

Patented June 19, 1951

2,557,153

UNITED STATES PATENT OFFICE 2,557,153

RADIO OBJECT LOCATING SYSTEM

Winston H. Starks, Hardin, Ky.

Application June 19, 1945, Serial No. 600,327

1 Claim. (Cl. 343—14)

(Granted under the act of March 3, 1883, as amended April 30, 1928; 370 O. G. 757)

The invention described herein may be manufactured and used by or for the Government for governmental purposes, without the payment of any royalty thereon.

This invention relates to improvements in devices of the object locating type for locating and determining the range of objects.

The detector herein described is not the usual type of radar apparatus which sends out pulses of energy to determine the range of an object. Instead, the present device employs a method of frequency modulation of a transmitter, which considerably simplifies the apparatus.

It is an object of this invention to provide an apparatus which can be used for very short range detection of metallic objects on the ground in front line areas of a battle zone. Its purpose is to detect enemy positions, gun emplacements and movement of enemy vehicles behind enemy lines.

This and other objects are attained by the novel construction and arrangement of parts hereinafter described and illustrated by the accompanying drawings, forming a part hereof and in which:

Figure 1 is a perspective view illustrating the use of the apparatus.

Figure 2 is a schematic diagram of the circuit of a transmitter used in the apparatus.

Figure 3 is a schematic diagram of a receiver circuit used in the apparatus.

In accordance with the invention, the apparatus is built into a small pack 1 which can be carried on the back of an infantry operator. The transmitter and receiver are electrically connected to a parabolic radar antenna 2 mounted on a small frame 3 so that it can be carried and aimed by a fire arm held in the hands of the operator. A small compass 4 can be mounted on the directional antenna for getting the bearing of an object in degrees from north.

The transmitter is required to produce a very high radar frequency, about 600 mc. In Fig. 2 is shown a schematic diagram of the transmitter, which comprises a power amplifier tube 5 at high frequency, a frequency multiplier 6, a master oscillator 7 for producing the radio frequency signal, a reactance modulator 8, and an oscillator 9 which controls the frequency of modulation of the master oscillator 7. The modulation of modulator 8 is controlled by the resistor 10. A capacitor 11 in the modulation oscillator 9 controls the frequency of modulation of the master oscillator. All of the capacitors and resistors are fixed except capacitor 11 which the operator adjusts to calculate the range of the object located by the apparatus. Power is supplied by a small high voltage vibrator power unit operating off non-spillable airplane type wet cells or the like. The output of the transmitter is fed through a coaxial cable 12 to the small parabolic antenna 2. The transmitter is modulated so that it has a frequency deviation from 599 mc. to 600 mc. Thus, the unmodulated frequency of the transmitter would be 599.5 mc.

The receiver shown in Figure 2 comprises a radio frequency amplifier tube 13, tuned to 600 mc, for example. A second tube 14 is tuned to 600 mc., and a converter 15 is tuned to 600 mc. An injector grid circuit includes a tuned circuit which is resonant at 599 mc. and this circuit picks up radio frequency energy from the transmitter at the instant that the transmitter is radiating energy on 599 mc. Ordinarily no conversion takes place in the converter unless a signal is picked up after being reflected for a distant object.

Included in the receiver are intermediate frequency amplifiers 16 and 17, at a frequency of 1 mc. Ordinarily, there is nothing for the intermediate frequency amplifiers to amplify. Only when a reflected wave from a distant object beats with the 600 mc. frequency, is there a signal in the intermediate frequency amplifiers. Obviously, there must be an adjustment to get the right time delay of the reflected waves so that the proper beat note will be heard.

In operation, the control capacitor 11 must be adjusted so that the transmitter is modulated at the proper frequency to give a radiated signal, which when reflected back to the receiver, will have the correct time delay so that energy at a frequency of 600 mc. will reach the receiver at the exact time that the transmitter frequency becomes 599 mc. This gives a beat note in the receiver converter of a frequency of 1 mc. Therefore, the intermediate frequency amplifiers are tuned to 1 mc., and the R. F. amplifiers to 600 mc., with the energy from the transmitter injected into the converter through the injector grid. There will be no beat frequency in the receiver converter when there is no reflected signal. Neither is there a beat frequency if the reflected signal is returned to the transmitter in phase with the signal leaving the transmitter. Therefore, the operator must adjust control 11 so that the highest beat note is heard in the headphones. This beat note is obtained in the conventional way by using a beat frequency oscillator in the I. F. circuit to beat with the 1 mc. frequency. The tone in the headphones will be highest in pitch when the control 11 is properly adjusted.

If the modulation frequency of the transmitter is too low, the transmitter will not have sufficient time to make the maximum frequency deviation before the reflected wave returns. The radio frequency energy leaving the antenna at the frequency of 600 mc. must return from reflecting object to the receiver at the exact time that the transmitter is producing radio frequency energy on the frequency of 599 mc. Therefore, if the modulation frequency is too high, the reflected 600 mc. energy will reach the receiver after the frequency had shifted to 599 mc.

I claim:

An apparatus for locating and determining the range of objects, comprising a transmitter emitting signals at a predetermined frequency, a receiver to receive signals reflected from a located object and from said transmitter, means to frequency modulate the predetermined frequency whereby the emitted signals are varied between a higher frequency and a lower frequency about said predetermined frequency to produce a second frequency during the time the signal frequency is reflected back to the receiver, means for controlling the degree of modulation of said emitted signals, said means for controlling being calibrated to indicate the range of objects, said receiver having a first portion which is tuned to said higher frequency for receiving said reflected signal, and a second portion tuned to said lower frequency for receiving energy directly from the transmitter at said lower frequency, and means to produce in the receiver a reference beat frequency equal to the difference between the reflected signal frequency and the second frequency.

WINSTON H. STARKS.

REFERENCES CITED

The following references are of record in the file of this patent:

UNITED STATES PATENTS

| Number | Name | Date |
| --- | --- | --- |
| Re. 21,955 | Chaffee | Nov. 25, 1941 |
| 2,011,392 | Bentley | Aug. 13, 1935 |
| 2,268,643 | Crosby | Jan. 6, 1942 |
| 2,416,351 | Schelleng | Feb. 25, 1947 |
| 2,417,815 | Earp | Mar. 25, 1947 |
| 2,466,532 | Carlson | Apr. 5, 1949 |

OTHER REFERENCES

Popular Science, page 75, March 1940.

Radio-Craft, "Canada's Interference Detectives," page 686, April 1938.